(12) United States Patent
Minges

(10) Patent No.: US 7,101,604 B1
(45) Date of Patent: *Sep. 5, 2006

(54) FOOTWEAR SOLE HAVING A NATURAL GRIP

(76) Inventor: Donald L. Minges, 2203 Wittstock Dr., Charlotte, NC (US) 28210

( * ) Notice: Subject to any disclaimer, the term of this patent is extended or adjusted under 35 U.S.C. 154(b) by 343 days.

This patent is subject to a terminal disclaimer.

(21) Appl. No.: 10/261,255

(22) Filed: Sep. 30, 2002

Related U.S. Application Data

(63) Continuation-in-part of application No. 08/525,495, filed on Sep. 5, 1995, now Pat. No. 6,544,626.

(51) Int. Cl.
*B32B 3/00* (2006.01)

(52) U.S. Cl. .......................... 428/141; 36/28; 36/59 R; 36/59 C; 428/156; 428/167; 428/187; D2/902; D2/951

(58) Field of Classification Search ................ 428/141, 428/156, 167, 187; D2/902, 951; 36/28, 36/59 R, 59 C
See application file for complete search history.

(56) References Cited

U.S. PATENT DOCUMENTS

| | | | |
|---|---|---|---|
| 3,402,485 A | 9/1968 | McMorrow | |
| D247,832 S | 5/1978 | Glasgow et al. | |
| 4,266,349 A | 5/1981 | Schmohl | |
| 4,494,321 A | 1/1985 | Lawlor | |
| D287,903 S | 1/1987 | Jones et al. | |
| 4,697,361 A | 10/1987 | Ganter et al. | |
| D295,114 S | 4/1988 | Horne | |
| D304,390 S | 11/1989 | Nakano | |
| D309,670 S | 8/1990 | Mendonca | |
| D319,338 S | 8/1991 | Nakano | |
| D337,428 S | 7/1993 | Allen, III et al. | |
| 5,442,816 A * | 8/1995 | Seketa | 2/161.7 |
| 5,465,507 A | 11/1995 | Schumacher et al. | |
| 6,544,626 B1 * | 4/2003 | Minges | 428/141 |

* cited by examiner

*Primary Examiner*—Nasser Ahmad
(74) *Attorney, Agent, or Firm*—Dougherty Clements; Ralph H. Dougherty; F. Rhett Brockington

(57) ABSTRACT

The invention is footwear having an outer sole(s) with an ergonomic gripping or traction surface. More particularly, the ergonomic gripping or traction surface is a gripping and traction pattern, formed as an integral part of a shoe sole, that is based on a natural footprint or hand print of a human. A footprint or hand print is not a flat surface, but a combination of various anatomical elements of differing size, shape, and contour. The present invention is molded as an integral part of an elastically deformable and compressible outer sole, and incorporates the elements and characteristics of the footprint or hand print, or combinations thereof. The sole has multiple projections which stand away from the base of the sole, thereby creating adjacent raised and recessed areas. The projections correspond to the actual anatomy of the human foot or hand.

11 Claims, 11 Drawing Sheets

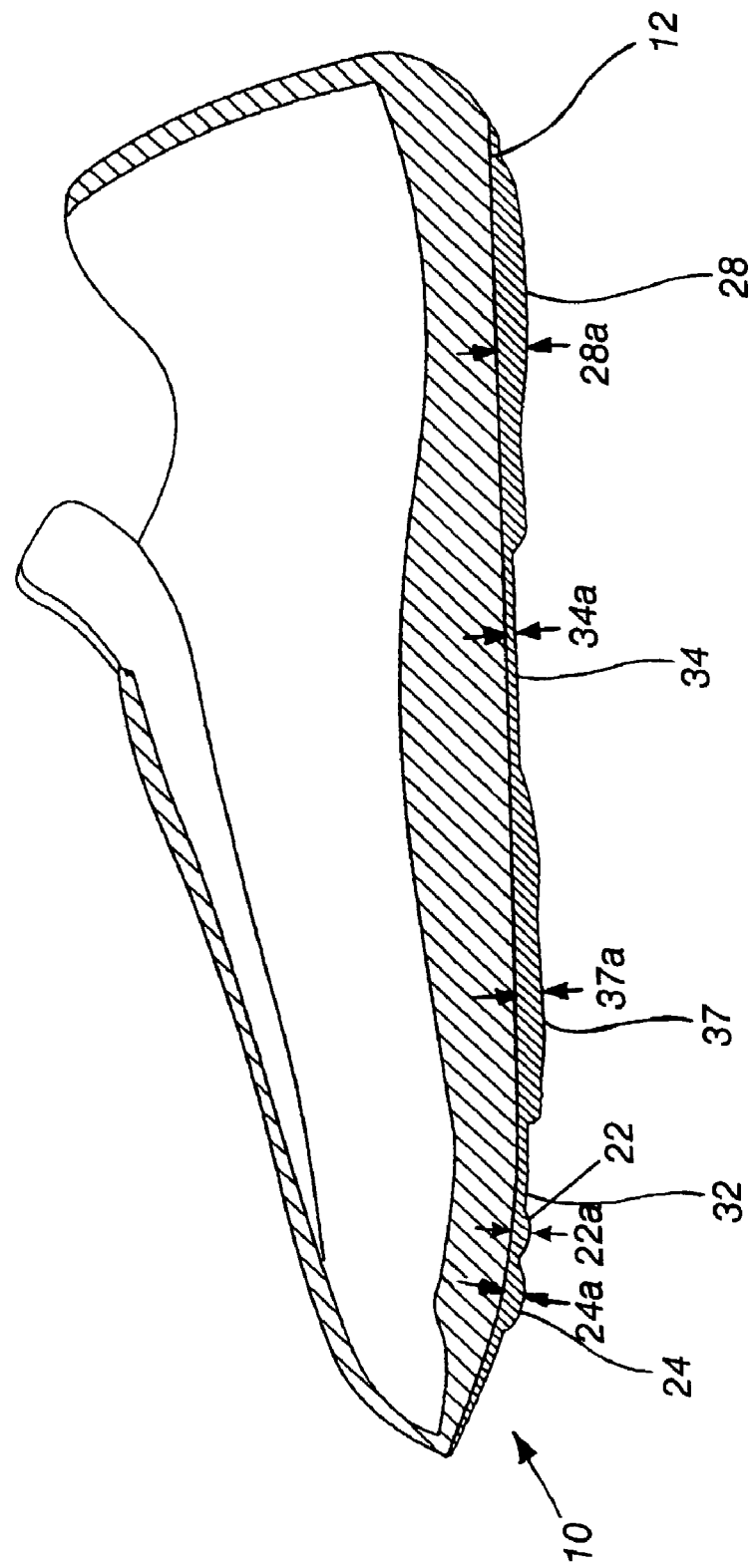

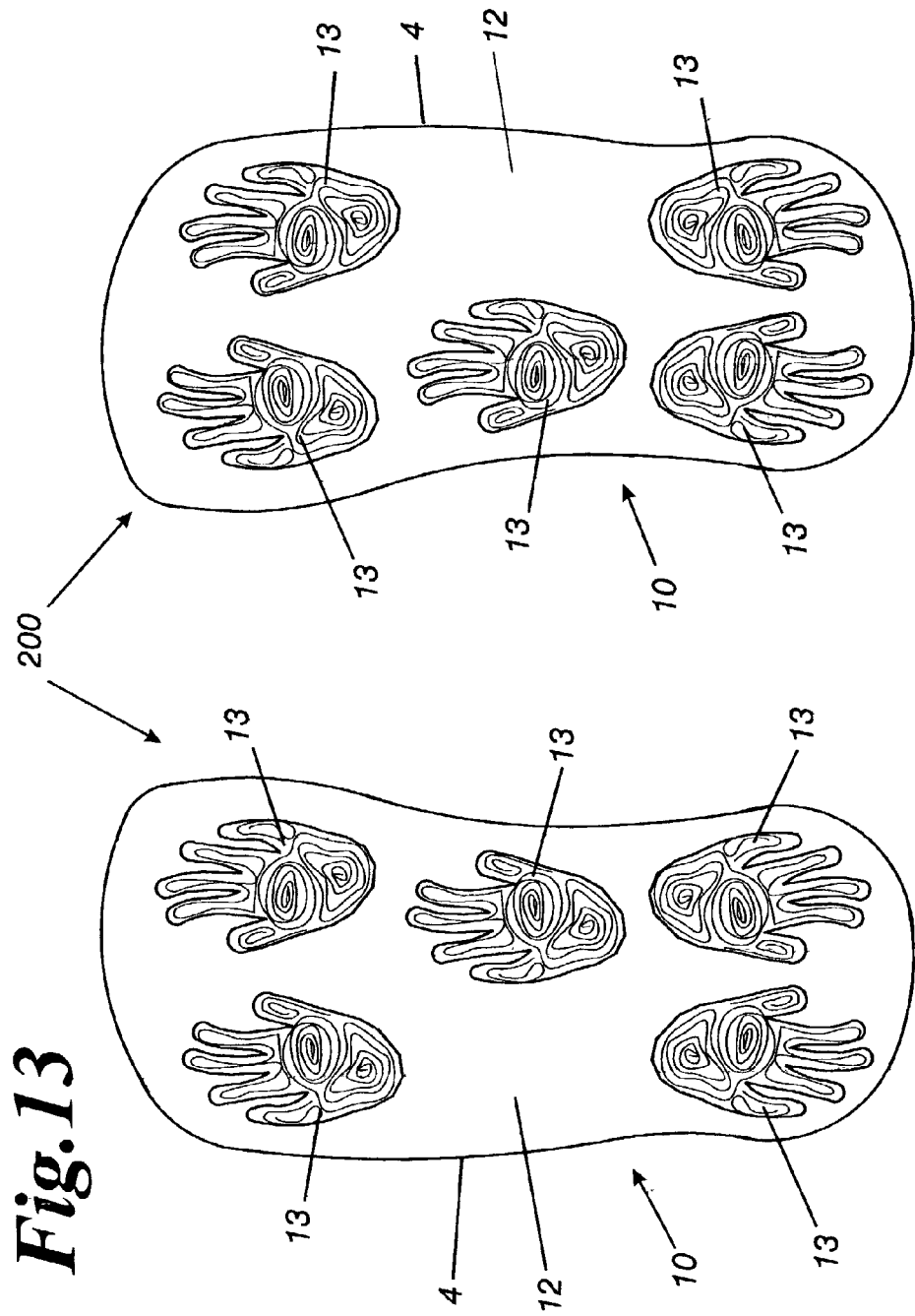

FOOTWEAR SOLE HAVING A NATURAL GRIP

CROSS-REFERENCE TO RELATED PATENT APPLICATIONS

This application is a continuation-in-part of U.S. patent application Ser. No. 08/525,495 now U.S. Pat. No. 6,544,626, which was filed on Sep. 5, 1995, and is entitled "Natural Grip."

FIELD OF THE INVENTION

The present invention relates to gripping and traction surfaces and patterns, particularly for attachment to footwear, handwear, and tools, and more particularly to a footwear sole with an improved pattern having the shape and configuration of the bottom of a human foot, or a palm side of a human hand.

BACKGROUND OF THE INVENTION

It is known in the art to provide a traction or gripping surface made of an elastically deformable and compressible material having a tread pattern of differing shapes and designs to improve the traction of the device to which it is attached, specifically shoe soles, gloves, and mechanical gripping devices. Heretofore, shoe soles have included varying patterns of geometric shapes. During the act of walking or running, the anatomy of the bare human foot, with its numerous curves, contours, and recesses, provides superior traction and gripping ability. Therefore, the need for a sole with an outer surface that very closely approximates the anatomy of a human foot or hand is evident. Previous attempts to provide such a sole have proven inadequate.

DESCRIPTION OF THE PRIOR ART

The applicant is aware of the following patents pertaining to footwear soles:

| Patent No. | Issue Date | Inventor | Title |
| --- | --- | --- | --- |
| Des. 247,832 | May 9, 1978 | Glasgow et al. | SHOE BOTTOM UNIT |
| Des. 287,903 | Jan. 27, 1987 | Jones et al. | SHOE SOLE |
| Des. 295,114 | Apr. 12, 1988 | Horne | SHOE SOLE |
| Des. 304,390 | Nov. 7, 1989 | Nakano | SHOE SOLE |
| Des. 309,670 | Aug. 7, 1990 | Mendonca | SHOE SOLE |
| Des. 319,338 | Aug. 27, 1991 | Nakano | SHOE SOLE |
| Des. 337,428 | Jul. 20, 1993 | Allen, III et al. | SHOE OUTSOLE |
| U.S. Pat. No. 3,402,485 | Sep. 24, 1968 | McMorrow | ANIMAL TRACK FOOTWEAR SOLES |
| U.S. Pat. No. 4,266,349 | May. 12, 1981 | Schmohl | CONTINUOUS SOLE FOR SPORTS SHOE |
| U.S. Pat. No. 4,494,321 | Jan. 22, 1985 | Lawlor | SHOCK RESISTANT SHOE SOLE |
| U.S. Pat. No. 4,697,361 | Oct. 6, 1987 | Ganter et al. | BASE FOR AN ARTICLE OF FOOTWEAR |
| U.S. Pat. No. 5,465,507 | Nov. 14, 1995 | Schumacher et al. | INTEGRAL SOLE WITH FOOTPRINT EMBOSSING |

Glasgow et al., U.S. Design Pat. 247,832, teaches an ornamental foot-shaped design for a shoe bottom.

Jones et al., U.S. Design Pat. 287,903, teaches an ornamental design for a shoe sole, which looks like an animal paw.

Horne, U.S. Design Pat. 295,114, teaches another ornamental foot-shaped design for a shoe sole.

Mendonca, U.S. Design Pat. 309,670, teaches a further ornamental foot-shaped design of a shoe sole.

McMorrow, U.S. Pat. No. 3,402,485, is directed to footwear that lays simulated animal tracks, which are incorporated into the sole.

Schmohl, U.S. Pat. No. 4,266,349, teaches a continuous sports shoe outsole that includes generally circular pattern elements in the ball and heel areas of the shoe sole to facilitate rotation of the foot. These pattern elements are roughly based on the arrangement of elements of the human foot.

Ganter et al., U.S. Pat. No. 4,697,361, teaches a footwear base made of elastically compressible material which yields in response to the application of stresses by the foot of the wearer of the shoe.

Schumacher et al, U.S. Pat. No. 5,465,507, teaches a footwear having an embossed footprint of a child and a hard rubber perimeter base plate, wherein the base plate provides a stabilizing platform for children learning how to walk.

The remaining patents listed show similar shoe sole designs, and are included for the sake of completeness.

SUMMARY OF THE INVENTION

The present invention embodies the ergonomic design of a gripping and traction surface. The present invention is a device to enhance the gripping or traction of footwear to which it is formed or attached. More particularly, the device is a gripping and traction pattern, formed as an integral part of a shoe sole, that is based on the natural footprint of a human foot. The bottom of the human foot is not a flat surface, but a combination of various anatomical elements of differing size, shape, and contour. The present invention is molded as an integral part of an elastically deformable and compressible outsole, and incorporates the elements and characteristics of the human foot. The sole has multiple projections which stand away from the base of the sole, thereby creating adjacent raised and recessed areas. Projections corresponding to the five toes, and large projections approximating the ball and heel of the foot, are formed in proportion to the actual anatomy of the human foot, thereby creating projections of varying heights. These projections create recessed areas corresponding to the areas between and behind the toes as well as other recessed areas of the human footprint, for instance the arch. These recessed areas allow the ground-engaging projections to adequately deform depending on the force exerted on the sole by the wearer. The outer surface of the outsole is textured with small ridges to mimic the dermal ridges that form the skin pattern of the human foot to further improve traction. The small ridges can generally be classified into five categories, where a category is optimized to either permit angular rotation or to increase traction, and the shape generally has some associated regional specificity. The five categories are lateral traction, backward traction, forward traction, forward pivoting and rearward pivoting. Lateral traction increases resistance to lateral slippage, backward traction increases resistance to forward slippage, forward traction increases resistance to backward slippage, forward pivoting enables angular rotation on the ball of the foot, and rearward pivoting enables angular rotation on the heel of the foot. In general, maximum resistance to slippage is attained when the small ridges are aligned substantially perpendicular to the direction of the force, and minimum resistance to slippage is attained when the dermal ridges are aligned along the direction of the force. Therefore, at or near pivot points, such as the ball of the human foot, the small ridges like dermal ridges are substantially a combination of indefinite loops, whorls and lines, and these naturally occurring patterns are of a human appendage which are non-uniform anatomical features cannot be geometrically characterized. While the footprint of a human foot is easily discernable as belonging to a human, any given footprint has many distinguishing features so that it is very rare for two people to have the same footprint. Accordingly, it is anticipated that there are many variations of the ergonomic design of the gripping and traction surface that fall within the scope of the invention.

Therefore, having neatly classified the texture of small ridges into only five different categories, the reality of the texture of the skin is significantly more complex, and is not easily given to descriptions in terms of simplistic shapes. For instance, closer examination of the dermal ridges in the region of the ball of the foot reveals that only the center most rings are concentric, and the other rings are progressively distorted as the ridges of one shape transform through a continuum to another shape. The continuum reflects an increasing blend of two or more shapes as they evolve to a shape weighted to enhance a performance characteristic, (resistance or slip) that is regionally specific, where the specificity reflects orientation. The small ridges mimic dermal ridges, and are similar in complexity.

The combination of skin texture and projections work in tandem to produce a natural grip which matches the anatomical architecture of the foot. The invention is an outer sole of footwear, wherein the natural grip of the human foot, is reproduced substantially exactly in the external surface of the outer sole.

The outer sole can be a unitary sole wherein the natural grip is a coextensive surface that is integral to the unitary sole. Alternatively, the outer sole can be formed as a laminate, wherein the laminate is comprised of at least two layers, where the surface topography of an outer surface of an outer layer of the laminate is anatomically similar to the sole of a human foot therein providing a natural grip. The laminate has the advantage that composite layers can be formed to impart various levels of flex. For instance a high quality athletic shoe has an outer sole that is a sandwiched laminate of both flexible and stiffer layers, where the flexible layer(s) imparts shock resistance, and the stiffer layer(s) reduces lateral distortion. Outer soles with the natural grip, both laminate and unitary soles, have enhanced gripping capabilities as the human foot is reproduced substantially exactly in the external surface of the outer sole, and the natural grip is imbued with properties which reflect the combination of skin texture and projections. The laminate has the additional advantage that composite layers can be formed such that the stiffer layer has projections which reinforce the outer flexible layer, where the projections correspond to the anatomical regions of the human foot that are reinforced with bone. For instance a toe is a dermal layer stiffened by bone. The counterpart in the invention comprises a laminate sole, wherein a stiffer layer with support projections that is laminated to a flexible layer having an outer surface that is anatomically similar to the outer sole of a human foot, and an inner topography having recesses that receive the support projections of the underlying stiffer layer.

In applications requiring greater tactility, the natural grip is a component of the sole of a bootie, where the bootie fits a foot similar to the way a flexible, stretchable glove fits one's hand. The outer sole of the bootie is comprised of a covering which is a thin, elastically deformable material incorporating the shape, contour, and features of the human footprint. The bootie is especially well suited for activities which currently use specialized slippers, such as ballet slippers, swimming slippers, medical uniform shoe covers, gymnastics shoes and tight rope walking slippers where tactility is of upmost importance, with some measure of protection.

The present invention is envisioned not only to be applicable to shoe soles and booties for wear by humans, but also to the makers and users of movable automated equipment, such as robots, where gripping traction is desired. Additionally, the inventive concept can be expanded to provide devices for superior traction and gripping power for numerous applications, such as gripping tools, prostheses, or any other similar device.

It is further recognized that in certain footwear applications, especially those in which there is a blend of functionality and decoration, such as a sole for a sandal or a flip flop, the full footprint need not be reproduced. The sole can have portions of the human footprint, multiple footprints of varying sizes, footprints with various orientations (for instance backwards) and combinations of the foregoing.

It is also further recognized that a hand print also shares the ergonomic design categories of the gripping and traction surface ascribed to the footprint, and that footwear can have an outer sole with portions of the human hand print, multiple hand prints of varying sizes, hand prints with various orientations (for instance backwards), combinations of the foregoing, and combinations of hand prints and footprints. The anatomical features of both the human hand and the human foot have good traction and gripping properties as well as a distinctively recognizable human appearance.

OBJECTS OF THE INVENTION

The principal object of the invention is to enhance the gripping or traction of articles to which it is formed or attached, namely, footwear and mechanical gripping or traction devices.

A further object of the invention is to provide a gripping and traction pattern for a sole of an article of footwear that approximates the shape and contour of the bottom of a foot, or portions thereof.

A still further object of the invention is to provide a gripping and traction pattern for a shoe sole having tread features that provide superior traction.

A still further object of the invention is to provide a gripping and traction pattern for a shoe sole that gives a more comfortable and natural feel to the wearer.

Another object of the invention is to provide an outer surface for a bootie and similar footwear that has improved tactility approaching the touch and feel that one experiences without a protective covering, yet still provides a measure of protection to the wearer.

A further object of the invention is to provide a gripping and traction pattern for a sole of an article of footwear that approximates the shape and contour of at least one hand print, or portions thereof.

A further object of the invention is to provide a gripping and traction pattern for a sole of an article of footwear that approximates the shape and contour of at least one footprint, or portions thereof.

BRIEF DESCRIPTION OF THE DRAWINGS

FIG. 5 is a cross-sectional view of the sole taken along sectional line 5—5 of FIG. 1. Toes 18 and 20 are obscured by the mid-line portion 37 of the large projection 38.

FIG. 13 is a plan view of a pair of sandals, wherein the soles of the sandals have multiple hand prints.

DETAILED DESCRIPTION OF THE INVENTION

Figure 1:
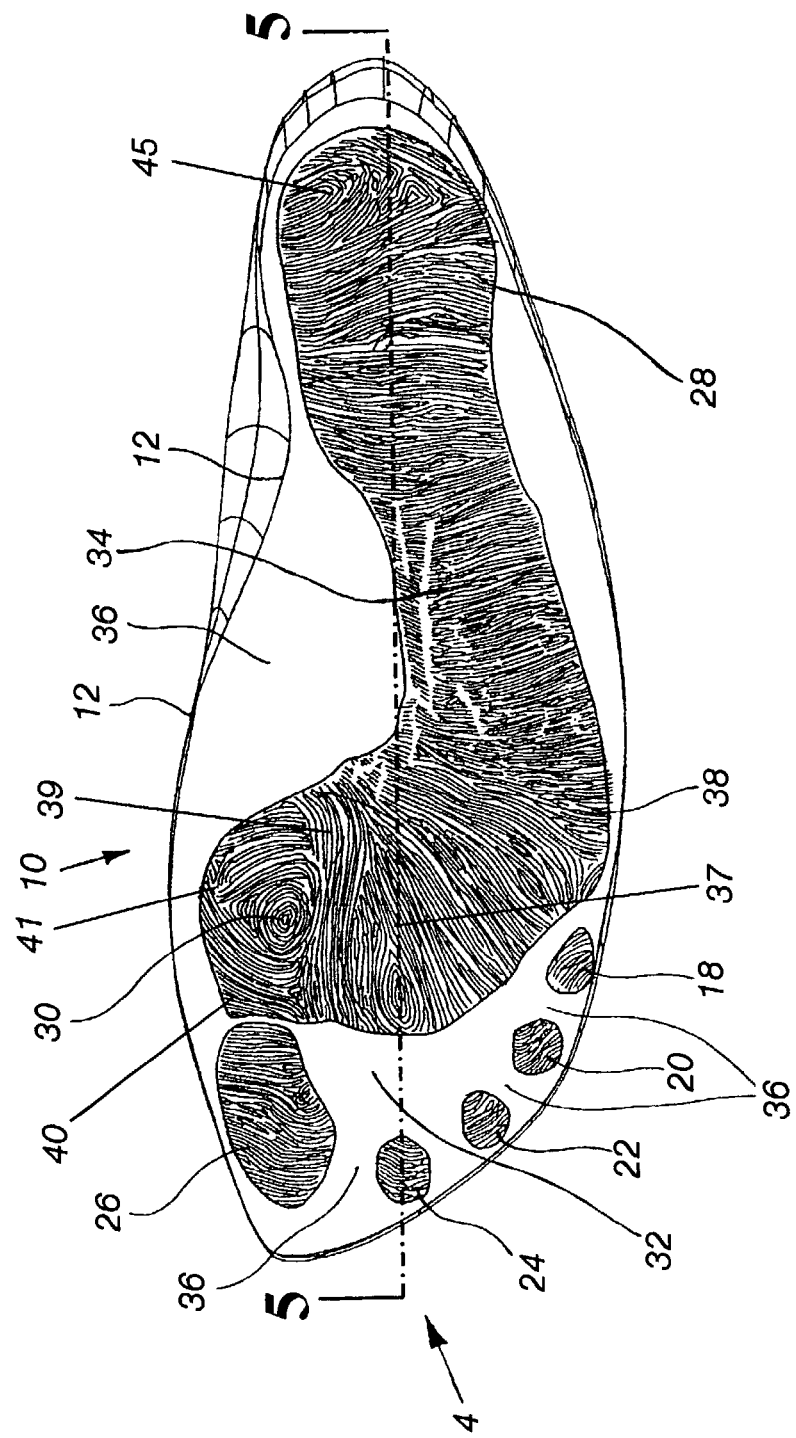
FIG. 1 is a plan view of a sole of a shoe in accordance with the present invention. The right sole is shown.
Figure 2:
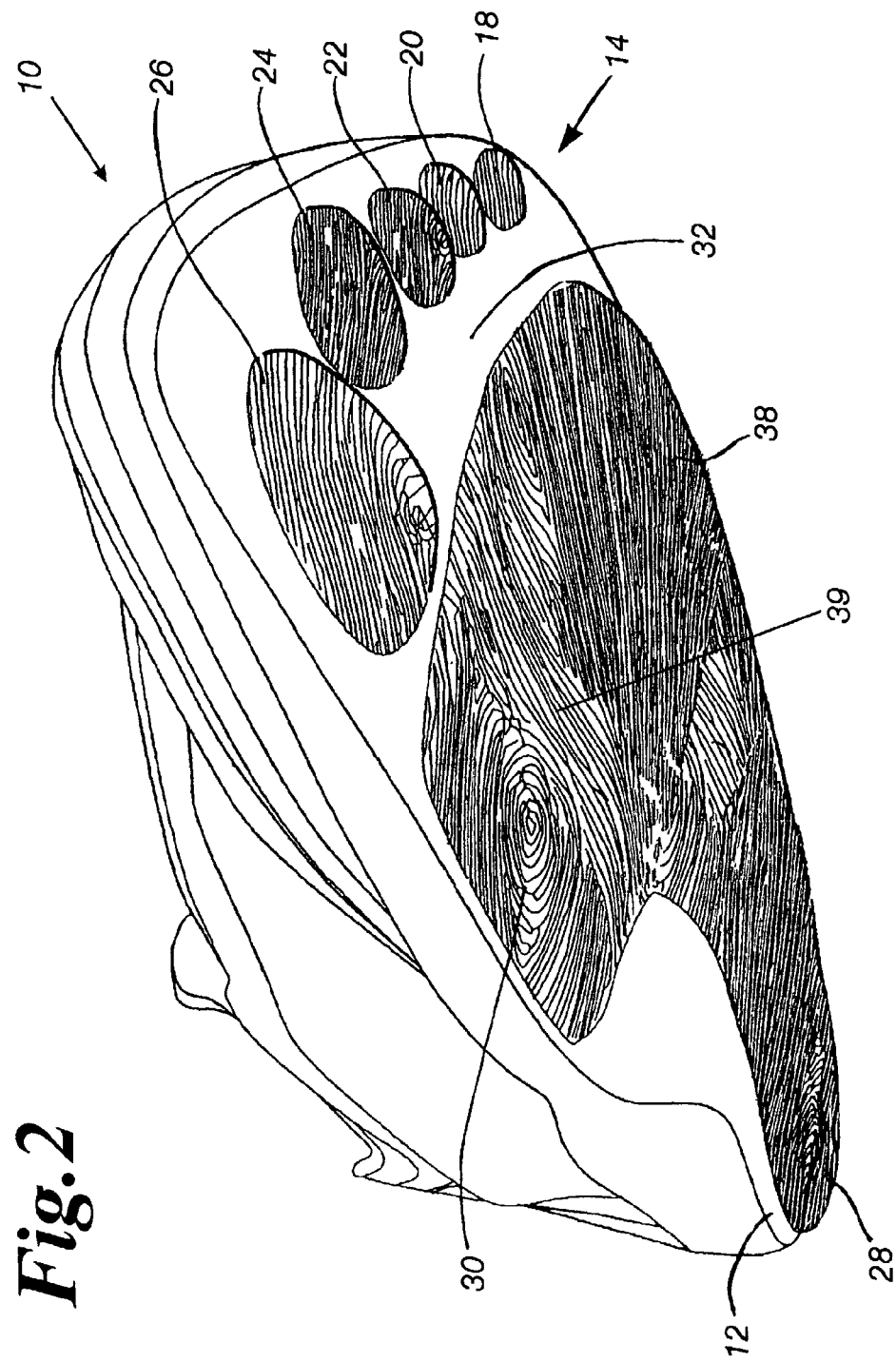
FIG. 2 is an isometric view of a left shoe of FIG. 1 having a sole embodying the present invention.
Figure 3:
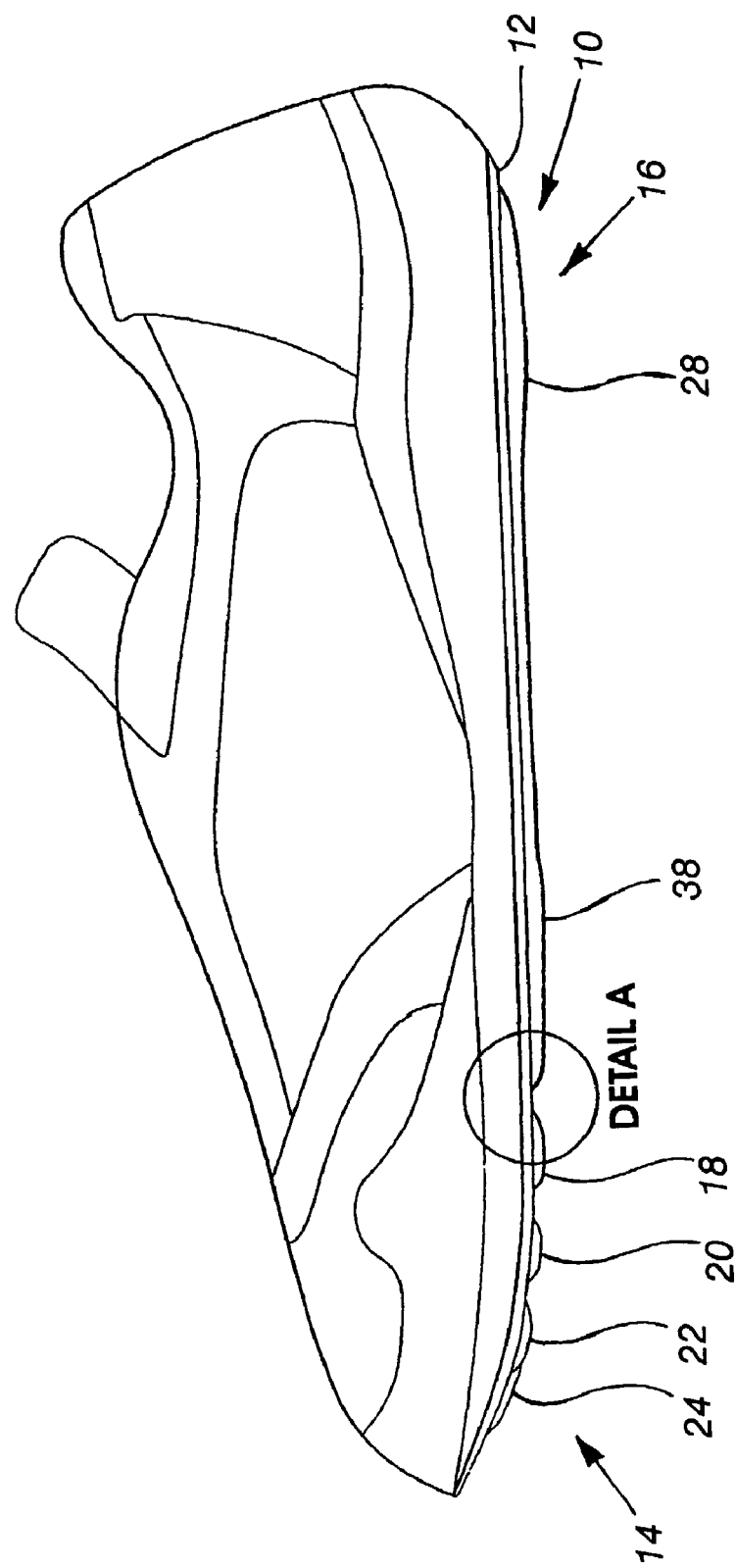
FIG. 3 is a side view of the shoe of FIG. 1 having a sole embodying the present invention. The left shoe is shown.

FIGS. 1, 2, and 3 show a shoe sole 10 constructed from an elastically deformable material. The sole has a base surface 12 that is substantially smooth and flat with a front portion of the base 14 corresponding to the toe area of the sole and a rear portion 16 corresponding to the heel area of the sole. Molded as an integral part of the sole are projections 18, 20, 22, 24, 26, 28, 30 which extend beyond the base surface 12 in varying shapes, contours, and heights.

FIG. 1 shows, at the front portion of the sole 4, five small projections 18, 20, 22, 24, and 26. The size, shape, and location of the projections correspond to the bottom tips of the toes of a human foot. Other large projections 28, 30 cover a substantial part of the sole 10, from the heel area to the area of the sole corresponding to the ball of the foot.

The projections are not necessarily uniform in the heights 24a, 28a, 37a and 34a by which they extend from the base surface 12, as seen cross-sectionally in FIG. 5. The height of any projection varies in relation to the variation in the three-dimensional anatomy of the human foot. The variation in projection height can also be based on the respective magnitude of force applied to the respective areas of the sole during walking or athletic activity. For example, the projection height 28a at the heel is greater than the projection height 34a at the instep. This variation in projection height, based on the anatomy of the foot, results in some areas on the outer sole where little or no projection occurs, leaving gaps and recesses 32, 36 as shown in FIG. 1. These recessed areas 32, 36 correspond to the areas of a human foot that do not necessarily directly contact the ground when a person is standing, such as the instep, and the areas between and behind the toes. These recessed areas of the human foot are very important to the acts of walking or running, however, because they allow the toes to grip the ground or floor surface when force is applied when walking, thereby creating superior traction. Similarly, the recesses 32, 36 in the invented sole allow the ground-engaging projections to adequately deform based on the force or stress applied by the wearer of the shoe. This deformation also supplies superior traction and a more natural feel for the wearer of the shoe.

Figure 4:
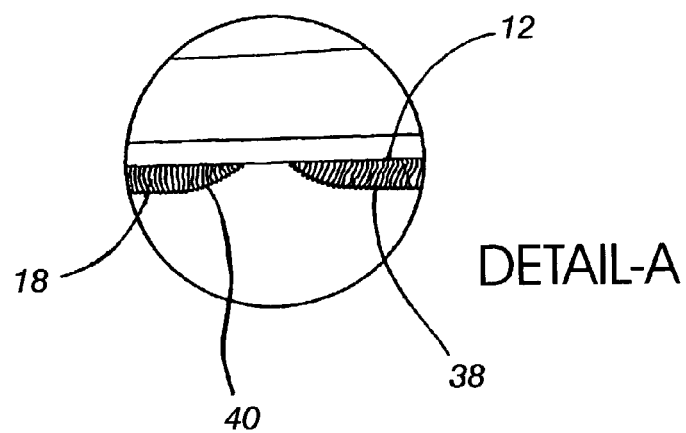
FIG. 4 is an enlarged side view of a portion of the sole of FIG. 3 showing the surface texture of the sole.

FIG. 4 shows an enlarged view of the outer surface of the projections corresponding to a little toe 18, and a volar surface of large projection 38 on the base 12. Integrally formed on all ground-engaging outer surfaces of all projections are a plurality of small ridges 40 that simulate the characteristic footprint of human skin. These small ridges, which are similar to dermal ridges, allow the ground-engaging surfaces of the elastically deformable sole to better grip the walking platform thereby creating superior traction.

Figure 6:
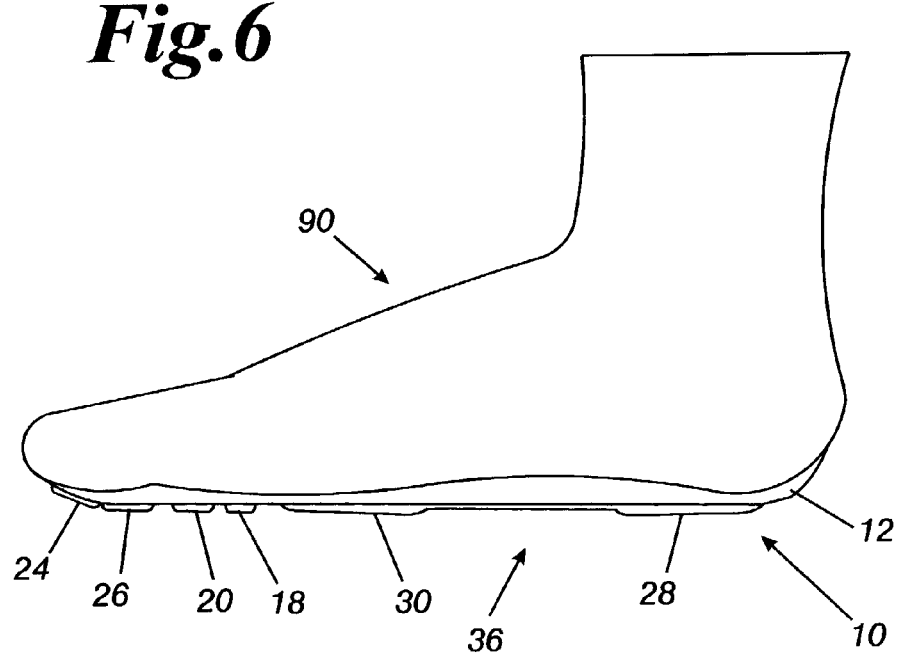
FIG. 6 is a side view of a bootie having a unitary sole having a gripping surface pattern embodying the present invention.

The best mode of carrying out the invention is accomplished where the gripping and traction surface is an integral part of the shoe sole 10, which is constructed of an elastically deformable material that is common to athletic shoes, such as rubber, PVC, polyurethane, or any suitable synthetic elastomeric substance. The shoe sole can be formed as a single layer, where the sole is cast or injection molded directly to the upper part of the shoe to integrally incorporate all of the features of the gripping pattern, including the base, projections, recesses, and ridges. Alternatively, the sole can be formed as a laminate having two or more layers, wherein the outer layer of the sole is cast or injection molded to integrally incorporate all of the features of the gripping pattern, including the base, projections, recesses, and ridges. FIG. 6 is an inner perspective side view of a right bootie 90 having a gripping surface pattern embodying the present invention, wherein the bootie has a unitary outer sole 10 formed by integrally bonding a very flexible rubbery layer imbued with the natural grip to an inner sole (not shown), where the inner sole is a layer of conformable fabric impregnated material. Four of the five small projections 18, 20, 24, and 26 are shown. The middle toe 22 is not visible from this view. The large projections, the heel 28 and the ball 30 and the small projections are on base 12.

Figure 7:
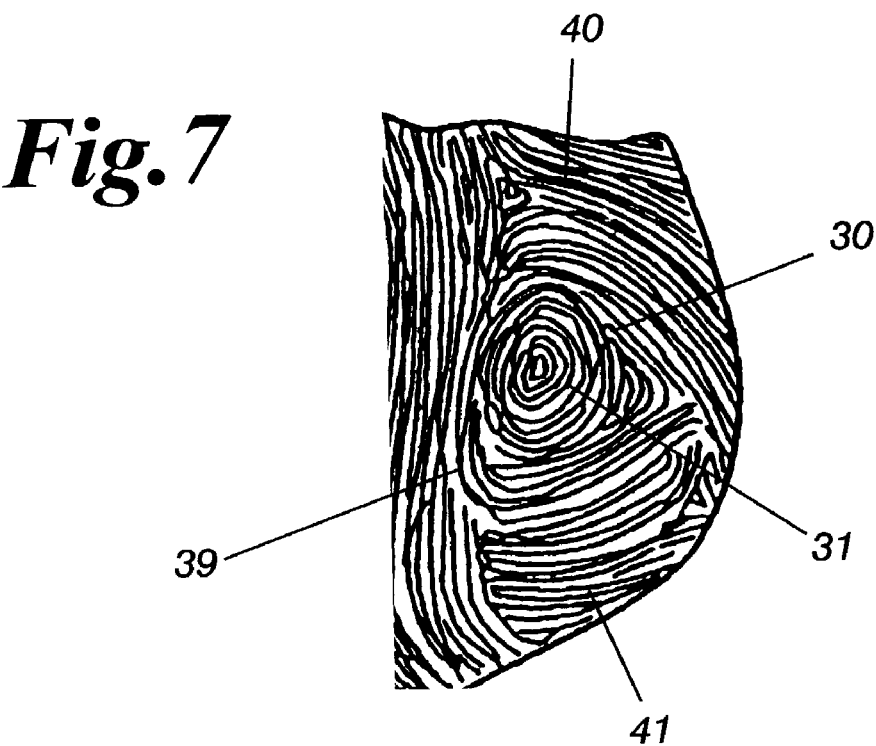
FIG. 7 is an enlarged substantially plan view of a portion of the invention shown in FIG. 1, illustrating the complexity of dermal ridges which make up the surface texture of the skin of a human foot.

FIG. 7 is an enlarged substantially plan view of a portion of the invention shown in FIG. 1, illustrating the complexity of small ridges which faithfully reproduces the dermal ridges which make up the surface texture of the skin of a human foot. The area shown in FIG. 7 is the area of the ball 30 of the foot. Note that the small ridges comprising the outer surface of the outer sole mimic the dermal ridges that form the skin pattern of the human foot to further improve traction. The small ridges can generally be categorized into five shapes, where a shape is optimized to either permit angular rotation or to increase traction, and the shape generally has some associated regional specificity. The five categories are lateral traction, backward traction, forward traction, forward pivoting and rearward pivoting. Lateral traction ridges 39 increases resistance to lateral slippage, forward traction ridges 40 increases resistance to backward slippage, backward traction ridges 41 increases resistance to forward slippage, and forward pivoting ridges 31 enables angular rotation on the ball of the foot. The rearward pivoting ridges 45, as seen in FIG. 1 which enable angular rotation on the heel of the foot, are less specifically defined. In general, maximum resistance to slippage is attained when the small ridges are aligned substantially perpendicular to the direction of the force, and minimum resistance to slippage is attained when the dermal ridges are aligned along the direction of the force. Therefore, at pivot points, such as the ball 30 of the human foot, the small ridges like dermal ridges are substantially concentric rings 31. From inspection of FIG. 1, lateral traction is enhanced when the dermal ridges 39 have a slightly angular orientation from the midline. The orientation is a composite to reduce lateral slippage and backward slippage. The dermal ridges on the toes 18, 20, 22, 24, and 26 are oriented with primarily with traction ridges and some component of lateral ridges. The dermal ridges just in front 40 of the ball 30 are substantially pure forward traction ridges. These ridges 40 undergo elongation minimizing backward slippage.

The dermal ridges to the rear 41 of the ball 30 are substantially pure backward traction ridges. The ridges 41 undergo elongation minimizing forward slippage. The ridges concentrated at the ball of the foot 30 are substantially of the pure forward pivoting type, wherein the ridges are substantially concentric rings that are angularly aligned with the rotation, and are therefore less susceptible to distortion. These naturally occurring patterns are of a human appendage, and as such are non-uniform anatomical features cannot be geometrically characterized. The center of heel 28 is similar to the ball 30, except that the weight is shifted to the rear, therein enabling rearward pivoting. The rear pivoting ridges are only partially defined for angular rotation.

Figure 9:
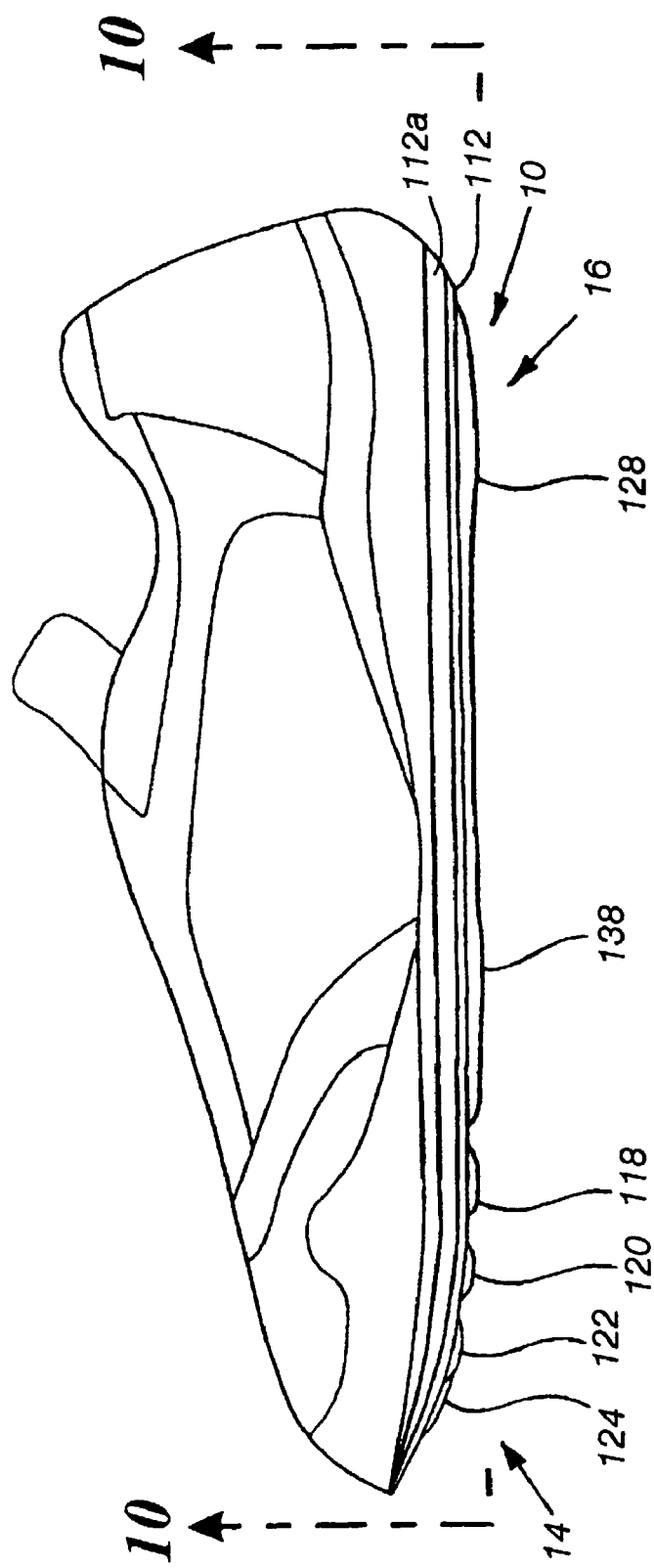
FIG. 9 is a side view of an athletic shoe having a sole that is a laminate embodying the present invention.

FIG. 9 is a side view of an athletic shoe having an outer sole that is a laminate embodying the present invention. The outer sole 10 is comprised of an external layer 116 having a base 112 with projections and an underlying support layer 113a. The support layer 113a is a relatively stiffer layer with projections that correspond to the supporting bones in a foot, and in a similar fashion, where the bones of toes are covered with a dermal layer, likewise the stiffer layer 113a is covered with a more pliable layer 112. The major projections of the laminate outer sole 110 are the heel 128 and the ball and the surrounding area 138. The minor projections at the front of the outer sole 114 correspond to the toes 118, 120, 122 and 124 of a human foot. The big toe is not visible in FIG. 9. The projections in the stiffer layer and the superimposed projections in the flexible layer form a surface having traction characteristics that are similar to a human foot. The outer sole 10 has the outward appearance of the shoe illustrated in FIG. 2. The projections originating in the relatively stiffer layer act similar to bones, and enable force to be move directionally precise; that in a sense act somewhat like prosthetic projections of the bones of the foot.

Figure 10:
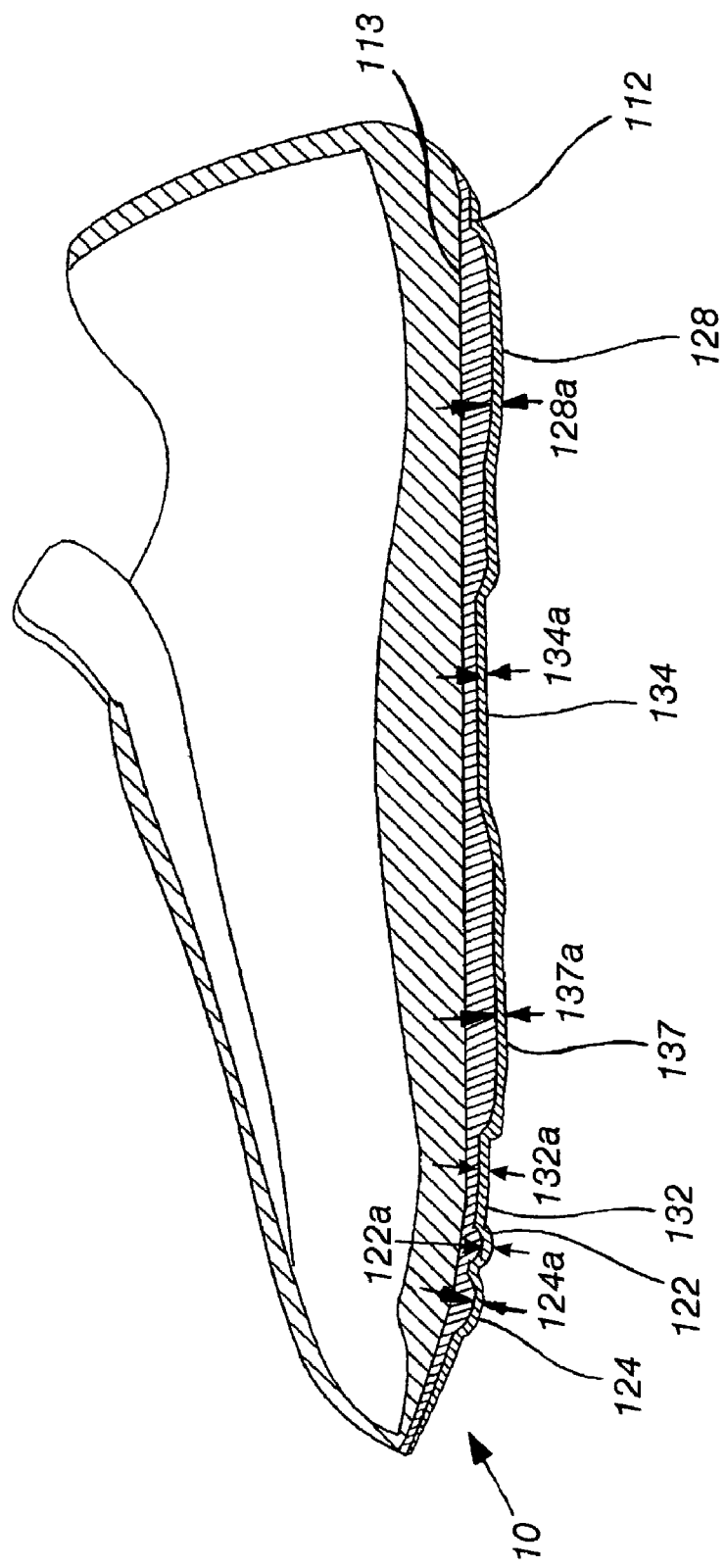
FIG. 10 is a cross-sectional view of the laminate sole taken along sectional line 10—10 of FIG. 9 illustrating a stiffer layer with support projections, wherein the stiffer layer is covered with an elastically deformable layer having a natural grip outer surface. Toes 118 and 120 are obscured by the large projection 138 in FIG. 9.

FIG. 10 is a cross-sectional view of the laminate sole taken along sectional line 10—10 of FIG. 9 illustrating a stiffer layer 113a with support projections, wherein the stiffer layer is covered with an elastically deformable layer having a natural grip outer surface. The cross-sectional view illustrates the laminate 10. As can be seen in FIG. 10, the relative thickness of the flexible layer 112 is nearly constant at the major projections 137 and 128, as well as at the minor projections, 124 and 122, and the recessed areas, 132 and 134, as indicated by the (respectively double arrows 122a, 124a, 128a, 132a, 134a and 137a). The stiff layer 113a above the projections is proportionately thicker so that the total thickness is comparable to those projections shown in FIG. 5 for the unitary sole, and indicated by 22a, 24a, 28a and 37a.

FIRST ALTERNATIVE EMBODIMENT

Figure 11:
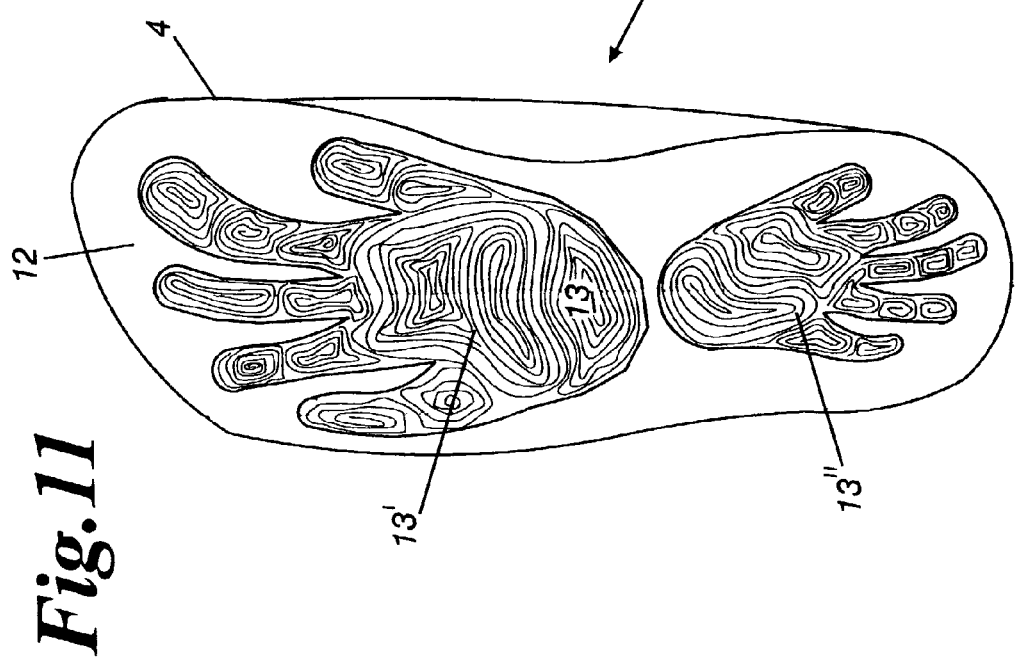
FIG. 11 is a plan view of a sole of a shoe in accordance with the present invention, wherein the outer sole has a forward hand print and a rearward hand print. The right sole is shown.

The shoe sole 10 illustrated in FIG. 11 depicts an outer sole 4 with a base 12 with at least one hand print 13. The outer sole 4 has a forward hand print 13' and rearward hand print 13".

Figure 12:
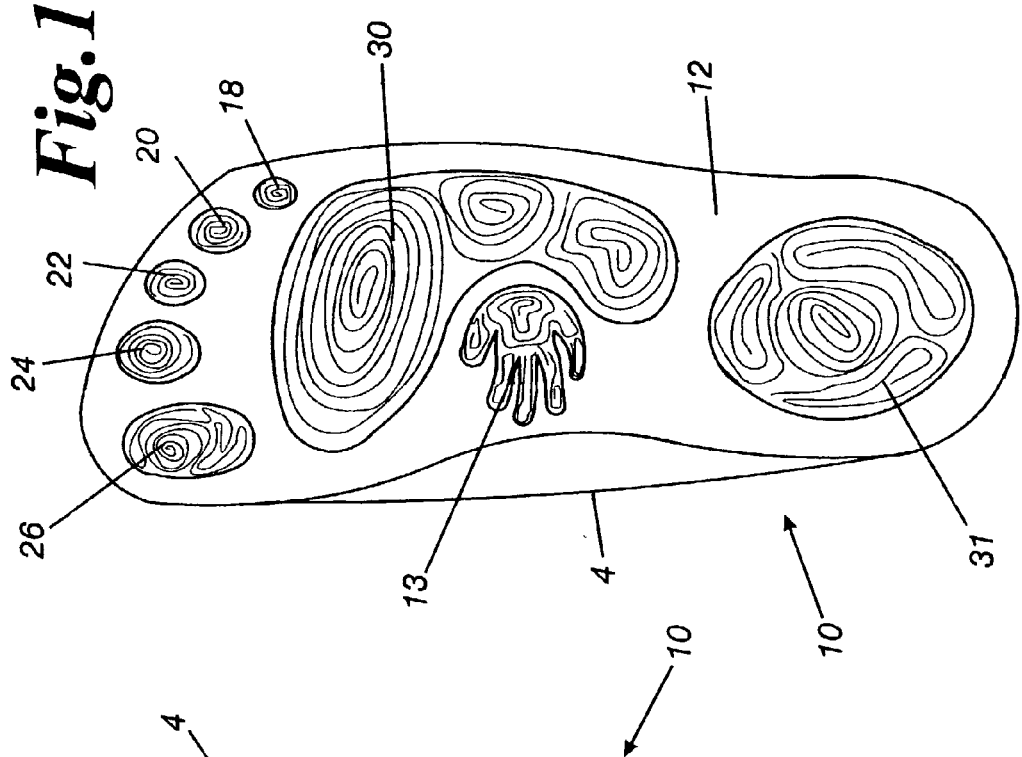
FIG. 12 is a plan view of a sole wherein the sole is textured to contain both a foot print and a hand print within the arch.

The shoe sole 10 shown in FIG. 12 is a composite of projections 26 (big toe), 24, 22, 20 and 18 (toes) and large projection 30. The rear of the base 12 has a portion of a footprint taken from the ball 31 of the foot (FIG. 7). In the area corresponding to the arch, the base 12 of the outer sole 4 has a small representation of a hand print 13.

Referring to FIG. 13, which is plan view of a pair of sandals 200. The outer soles 4 of the sandals have multiple hand prints 13 from the palm side of a human hand, wherein the natural grip of the human hand, is reproduced substantially exactly in the external surface of the outer sole 4. The outer sole 4 is a unitary sole, wherein the natural grip is a coextensive surface that is integral to the unitary sole 10.

Figure 14:
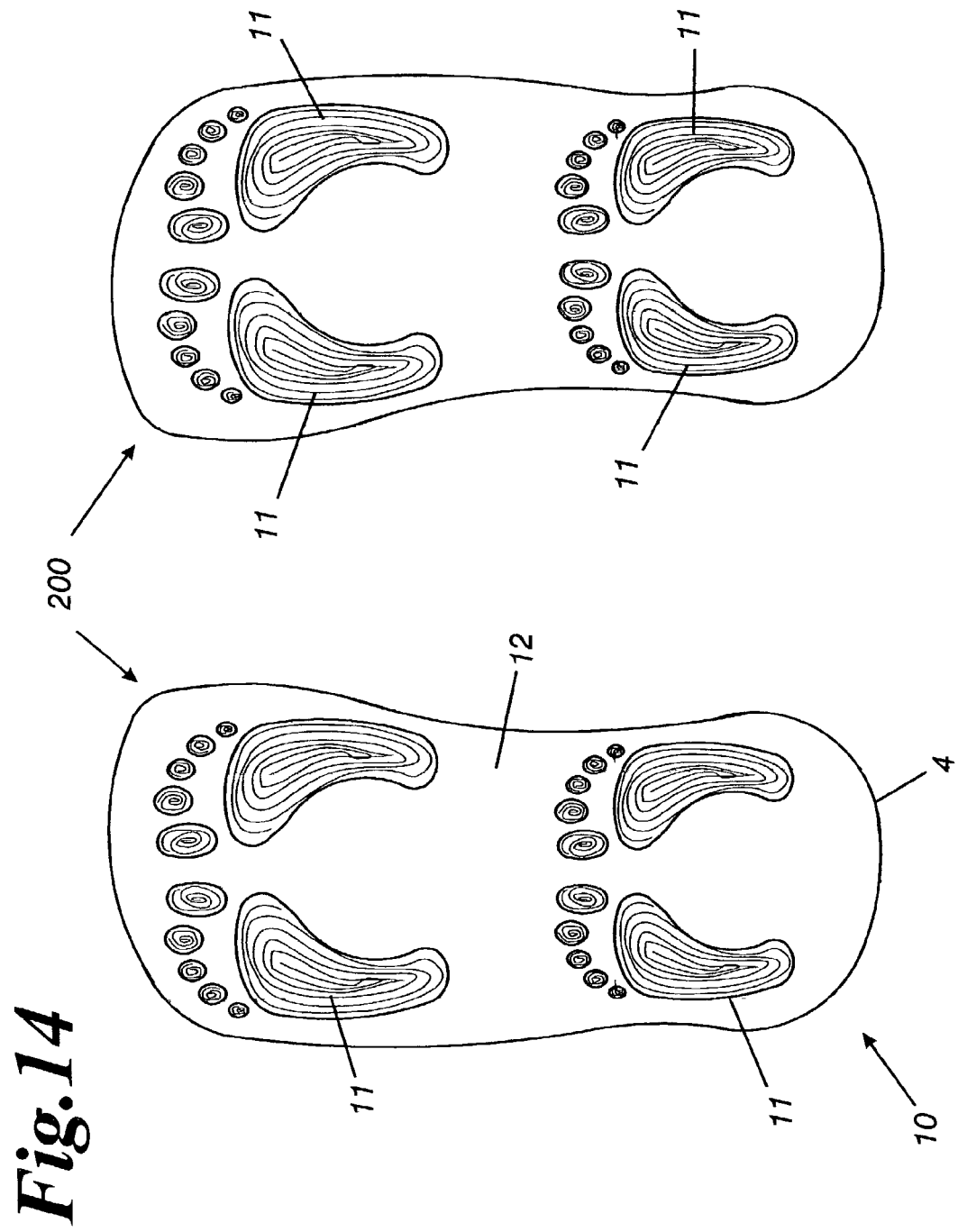
FIG. 14 is a plan view of a pair of sandals, wherein the soles of the sandals have multiple footprints.

FIG. 14 is similar to FIG. 13, albeit the outer soles of the sandals 200 have multiple footprints 11 integral to the outer sole 4.

SECOND ALTERNATIVE EMBODIMENT

Figure 8:
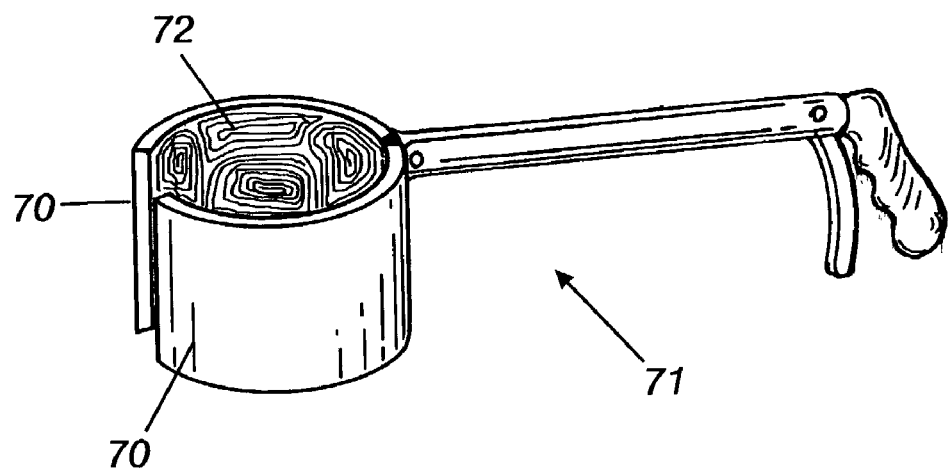
FIG. 8 is an isometric view of a mechanical gripping device, where the surface texture is of a human foot (exaggerated).

The present invention can be applied not only to footwear to be worn by humans, but also to any application where gripping traction is required, such as on gloves, tools, legs, arm members of automated machinery or robots. The development of technologically advanced machinery capable of carrying out mechanical tasks continues to expand. The invented gripping and traction pattern can be attached to any element of a device or machine in which superior gripping ability or traction is desired. FIG. 8 is an isometric view of a mechanical gripping device 71, where the surface texture of the rubber fascia plates 72, have the texture of a human foot. The dermal ridges are selected to prevent slippage, and are incorporated into the facial surface texture of the plate. The specific type of ridges are selected to improve gripping (resistance to slippage) in at least one direction. The mechanical gripping device 71 shown in FIG. 8 has one or more articulating jaws 70, where a jaw is inner fitted with an elastically deformable and compressible material, such as rubber used in shoe soles.

The gripping and traction pattern can be formed of any material suitable for use on the article to which it is to be attached; for example, the pattern for use on the sole of a shoe can be made of leather.

SUMMARY OF THE ACHIEVEMENT OF THE OBJECTS OF THE INVENTION

From the foregoing, it is readily apparent that I have invented a surface or pattern which enhances the gripping or traction of articles to which it is formed or attached, namely footwear, handwear, and mechanical gripping or traction devices, and which provides a more natural and comfortable feel for the wearer. Similarly, I have invented an improved surface for the gripping or traction portion of a shoe, glove, or mechanical gripping device which provides superior gripping ability and a natural feel.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. An ergonomic gripping or traction surface of an article comprising: a base surface with at least one projecting portion extending beyond the base surface, wherein each of the at least one projecting portion has a gripping or traction textured pattern, wherein said gripping or traction textured pattern has a proportion, configuration, and arrangement that emulates non-uniform anatomical features of at least a portion of a footprint of a foot of a human being, and wherein the textured pattern is comprised of a plurality of ridges that look and perform similarly to dermal ridges of the human skin on the sole of the foot; wherein said ergonomic gripping or traction surface is a laminate, where the laminate is comprised of at least two layers, a flexible outer layer and a stiffer inner layer, wherein the flexible outer layer and the stiffer inner layer are combined such that the combination imparts a desired degree of flex and tactility to the ergonomic gripping or traction surface.

2. The ergonomic gripping or traction surface according to claim 1, wherein said projecting portions which are integral to the stiffer inner layer, are received by the flexible outer layer such that the combination is anatomically similar to a dermal layer stiffened by bone.

3. An ergonomic gripping or traction surface of an article comprising: a base surface with at least one projecting portion extending beyond the base surface, wherein each of the at least one projecting portion has a gripping or traction textured pattern, wherein said gripping or traction textured pattern has a proportion, configuration, and arrangement that emulates non-uniform anatomical features of at least a portion of a hand print of a palm side of a band of a human being in, and wherein the textured pattern is comprised of a plurality of ridges that look and perform similarly to dermal ridges of the human skin on the palm side of the hand.

4. The ergonomic gripping or traction surface claimed in claim 3, wherein said article is footwear.

5. Footwear having an outer sole(s) with an ergonomic gripping or traction surface comprising: a base surface with at least one projecting portion extending beyond the base surface, wherein each of the at least one projecting portion has a gripping or traction textured pattern, wherein said gripping or traction textured pattern has a proportion, configuration, and arrangement that emulates non-uniform anatomical features of at least a portion of a hand print of a palm side of a hand of a human being, and wherein the textured pattern is comprised of a plurality of ridges that look and perform similarly to dermal ridges of the human skin on the palm side of the hand.

6. Footwear as claimed in claim 5 wherein said ergonomic gripping or traction surface has at least two hand prints, wherein said hand prints, or portions thereof, are variable in size and in orientation.

7. Footwear having an outer sole(s) with an ergonomic gripping or traction surface comprising: a base surface with at least one projecting portion extending beyond the base surface, wherein each of the at least one projecting portion has a gripping or traction textured pattern, wherein said gripping or traction textured pattern has a proportion, configuration, and arrangement that emulates non-uniform anatomical features of at least a portion of a hand print of a palm side of a hand and a footprint of a human being, and wherein the textured pattern is comprised of a plurality of ridges that look and perform similar to dermal ridges of the human skin on the palm side of the hand.

8. Footwear as claimed in claim 7, wherein said ergonomic gripping or traction surface has at least two hand prints or footprints, wherein said hand prints or foot prints, or portions thereof, are variable in size and in orientation.

9. The ergonomic gripping or traction surface according to claim 3, wherein said ergonomic gripping or traction surface is a unified sole for footwear.

10. The ergonomic gripping or traction surface according to claim 3, wherein said ergonomic gripping or traction surface is a laminate, wherein the laminate is comprised of at least two layers, a flexible outer layer and a stiffer inner layer, where the flexible outer layer and the stiffer inner layer are combined such that the combination imparts a desired degree of flex and tactility to the ergonomic gripping or traction surface.

11. Footwear having an outer sole(s) with an ergonomic gripping or traction surface according to claim 7, wherein said ergonomic gripping or traction surface is a laminate, wherein said projecting portions which are integral to the stiffer inner layer, are received by the flexible outer layer such that the combination is anatomically similar to a dermal layer stiffened by bone.

* * * * *